United States Patent
Lee et al.

(10) Patent No.: US 7,609,657 B2
(45) Date of Patent: Oct. 27, 2009

(54) NETWORK DEVICE AND ADDRESS LEARNING METHOD THEREOF

(75) Inventors: Chih-Chiang Lee, Hsinchu (TW); Li-Hua Wu, Hsinchu County (TW); Jia-Jang Young, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 462 days.

(21) Appl. No.: 11/511,373

(22) Filed: Aug. 29, 2006

(65) Prior Publication Data

US 2008/0059755 A1 Mar. 6, 2008

(51) Int. Cl.
*H04L 12/28* (2006.01)
(52) U.S. Cl. ............... 370/255; 370/395.32; 370/395.7; 709/220; 711/216
(58) Field of Classification Search ................... 711/221
See application file for complete search history.

(56) References Cited

U.S. PATENT DOCUMENTS

| | | | | |
|---|---|---|---|---|
| 5,633,858 A * | 5/1997 | Chang et al. | ................. | 370/255 |
| 6,018,526 A * | 1/2000 | Liu et al. | ..................... | 370/401 |
| 6,084,877 A * | 7/2000 | Egbert et al. | ................ | 370/389 |
| 6,308,218 B1 * | 10/2001 | Vasa | ........................... | 709/238 |
| 6,665,297 B1 * | 12/2003 | Hariguchi et al. | ........... | 370/392 |
| 6,915,296 B2 * | 7/2005 | Parson | ........................... | 707/4 |
| 6,922,410 B1 * | 7/2005 | O'Connell | .................. | 370/401 |

* cited by examiner

*Primary Examiner*—Huy D. Vu
*Assistant Examiner*—Brian Roberts
(74) *Attorney, Agent, or Firm*—Birch, Stewart, Kolasch & Birch, LLP

(57) ABSTRACT

An address learning method for a network device having a plurality of connection ports, at least one of which is electrically connected to a terminal device. The method includes a fetching process, a hashed-address generating process, a data registering process and an address registering process. The fetching process fetches an address data string from a first memory unit by a programmable logic device (PLD). The hashed-address generating process generates a hashed-address by the programmable logic device. The data registering process writes the address data string into an address data table. The address registering process writes the hashed-address into a hashed-address table. A network device for performing the address data learning method is also disclosed.

20 Claims, 4 Drawing Sheets

NETWORK DEVICE AND ADDRESS LEARNING METHOD THEREOF

BACKGROUND OF THE INVENTION

1. Field of Invention

The invention relates to a network device and an address learning method thereof, and, in particular, to a network device having a programmable logic device and an address learning method thereof.

2. Related Art

In the LAN (Local Area Network), a network device, such as a switch, is used to enable the data transmission between various terminal devices. The switch works on a second layer (i.e., data link layer) in a network OSI model, so the switch can recognize a MAC (Media Access Control) address of a terminal device connected thereto. Thus, if the switch knows the MAC address of each terminal device in advance, the switch only has to transfer the data packet to a specific terminal device according to the MAC address without broadcasting the data packet. Consequently, a large portion of the network bandwidth may be saved, and the transmission rate can be enhanced. The broadcasting method is to transfer the data packet out through all connection ports of the switch.

As shown in FIG. 1, a LAN (e.g., Ethernet) 1 is composed of a switch 11 and a plurality of terminal devices 12-15. The switch 11 has a plurality of connection ports 111-114. The terminal devices 12-15 are connected to the corresponding connection ports 111-114, respectively. When the terminal device 12 wants to transfer a data packet 121 to the terminal device 13, a target address has to be specified in the data packet 121 according to the Ethernet protocol. That is, the MAC address of the terminal device 13 is a 48-bit binary code, and the data packet 121 also includes a source address (i.e., the MAC address of the terminal device 12).

In addition, the switch 11 further has an address table, which is a look-up table for storing the MAC address of the terminal device and the connection port connected to the terminal device. The address table is recorded in a memory of the switch 11. When the terminal device 12 transfers the data packet 121 to the switch 11 through the connection port 111, the switch 11 performs two operations on the address table thereof. First, the switch 11 checks whether the address table has the source address of the data packet 121 through the program software. If not, the source address and the corresponding connection port 111 are written into the address table. Consequently, the switch 11 knows that the terminal device 12 is connected to the connection port 111. This is the so-called "address learning function".

Then, the switch 11 checks whether the address table has the target address (the MAC address of the terminal device 13) of the data packet 121. If yes, the switch 11 transfers the data packet 121 to the terminal device 13 through the connection port 112 connected to the terminal device 13 according to the address table. If the address table has no MAC address of the terminal device 13, the data packet 121 is transferred to other connection ports 112-114 of the switch 11. At this time, the data packet 121 is transferred by way of broadcasting. It is to be noted that the network transmission speed is decreased because the bandwidth is occupied by a lot of data packets when there are too many data packets transferred by way of broadcasting.

In addition, the switch 11 can support the virtual LAN (VLAN) technology. Simply speaking, the VLAN includes a plurality of sub-LANs divided from the whole LAN. For example, the terminal devices 12, 13 of FIG. 1 may be set as a first VLAN VLAN1, and the terminal devices 14, 15 may be set as a second VLAN VLAN2. Thus, when the data packet 121 becomes a broadcasting data packet, the switch 11 broadcasts the data packet 121 to the VLAN1 (only the terminal device 13 in this example), and the terminal device 13 is just the terminal device for receiving the packet. The broadcasting may be reduced according to the VLAN technology.

The switch 11 performs the address learning function by a software program. This is because the switch is only applied to the small range of the LAN as it is initially developed. That is, the number of terminal devices connected to the switch is smaller, and the address learning rate for the switch 11 is about 300 to 400 addresses per second. So, the requirement can be satisfied and the hardware cost can be saved when the software program is used to perform the address learning. However, the network is gradually popularized and is getting faster and faster, so the range of the LAN is getting larger and larger. For example, the address learning rate for the switch 11 in the Metro Ethernet will be higher than 128 k addresses per second, which depends on the scale of the Metro Ethernet. Consequently, when some topology changes occur, the data packet may be lost because the address learning speed of the switch 11 is not high enough. In addition, the switch 11 also has to broadcast a lot of packets, such that the network storm occurs and the transmission speed of the LAN is greatly reduced.

Thus, it is an important subject of the invention to provide a network device and an address learning method thereof, such that the address learning speed of the network device can be increased in the large LAN and the transmission speed and efficiency of the LAN may be increased.

SUMMARY OF THE INVENTION

In view of the foregoing, the invention is to provide a network device and an address learning method of the network device, which can increase the address learning speed to enhance the speed and efficiency in the large LAN such as the Metro Ethernet.

To achieve the above, the invention discloses an address learning method for a network device having a plurality of connection ports, at least one of which is electrically connected to a terminal device. The method includes a fetching process, a hashed-address generating process, a data registering process and an address registering process. The fetching process fetches an address data string from a first memory unit by a programmable logic device. The hashed-address generating process generates a hashed-address by the programmable logic device. The data registering process writes the address data string into a data table. The address registering process writes the hashed-address into a hashed-address table.

To achieve the above, the invention also discloses a network device including an ASIC, a second memory unit and a programmable logic device. The ASIC has a first memory unit. The second memory unit has a data table and a hashed-address table. The programmable logic device is electrically connected to the ASIC and the second memory unit has a fetching module, an address computing module and a registering module. The fetching module fetches an address data string from the first memory unit. The address computing module generates a hashed-address. The registering module respectively writes the address data string and the hashed-address into the data table and the hashed-address table.

As mentioned hereinabove, the network device has the programmable logic device for performing the address learning function by the fetching module, the address computing module and the registering module. Compared to the prior art, the invention performs the address learning function by the programmable logic device having logic gates but not the software program. So, the learning speed may be greatly increased such that at least 100k addresses may be learned per second. Consequently, the opportunity for the network device to transfer data packets by way of broadcasting can be decreased because the address learning speed is increased in the large LAN such as the Metro Ethernet. Thus, the usage of the network bandwidth can be enhanced, and the speed and efficiency of the LAN may be enhanced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
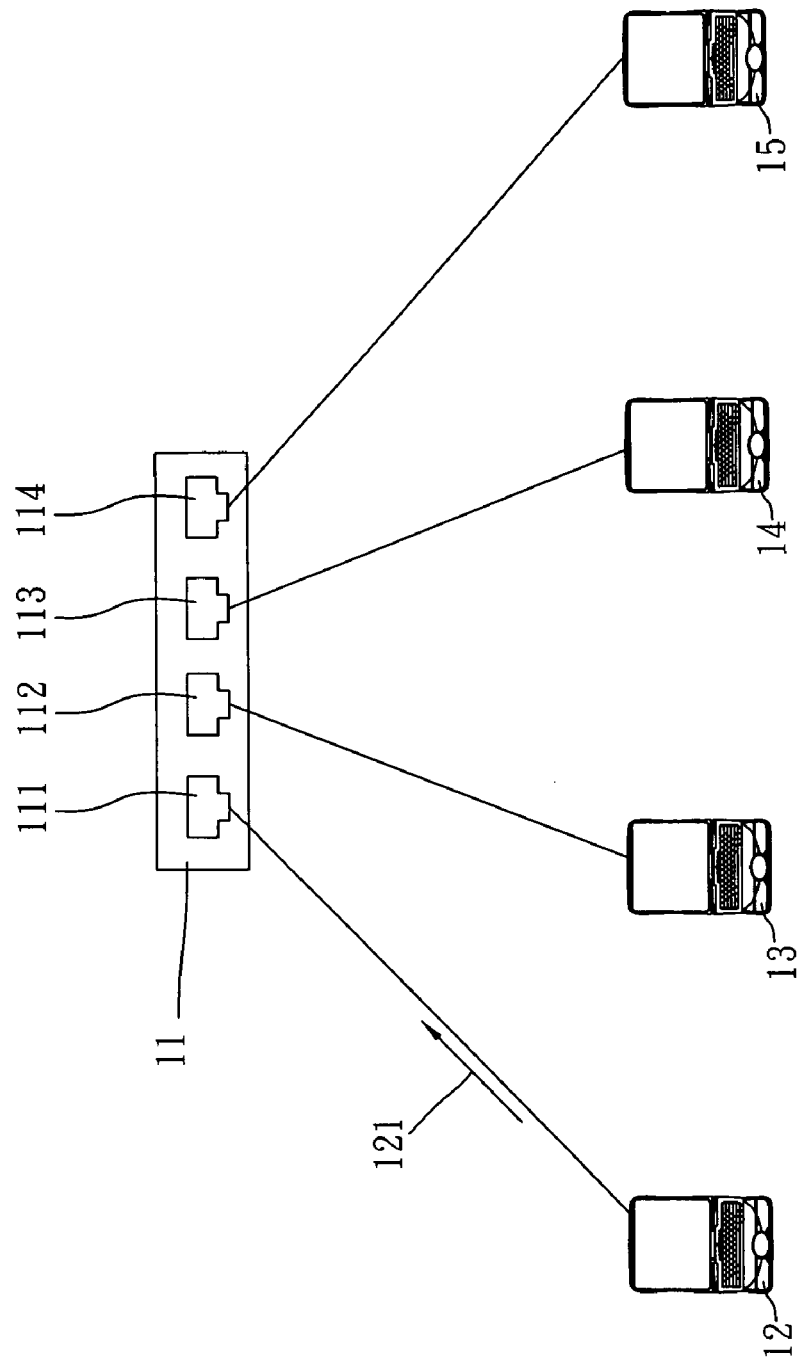
FIG. 1 is a schematic illustration showing the LAN having a switch according to the prior art.
Figure 2:
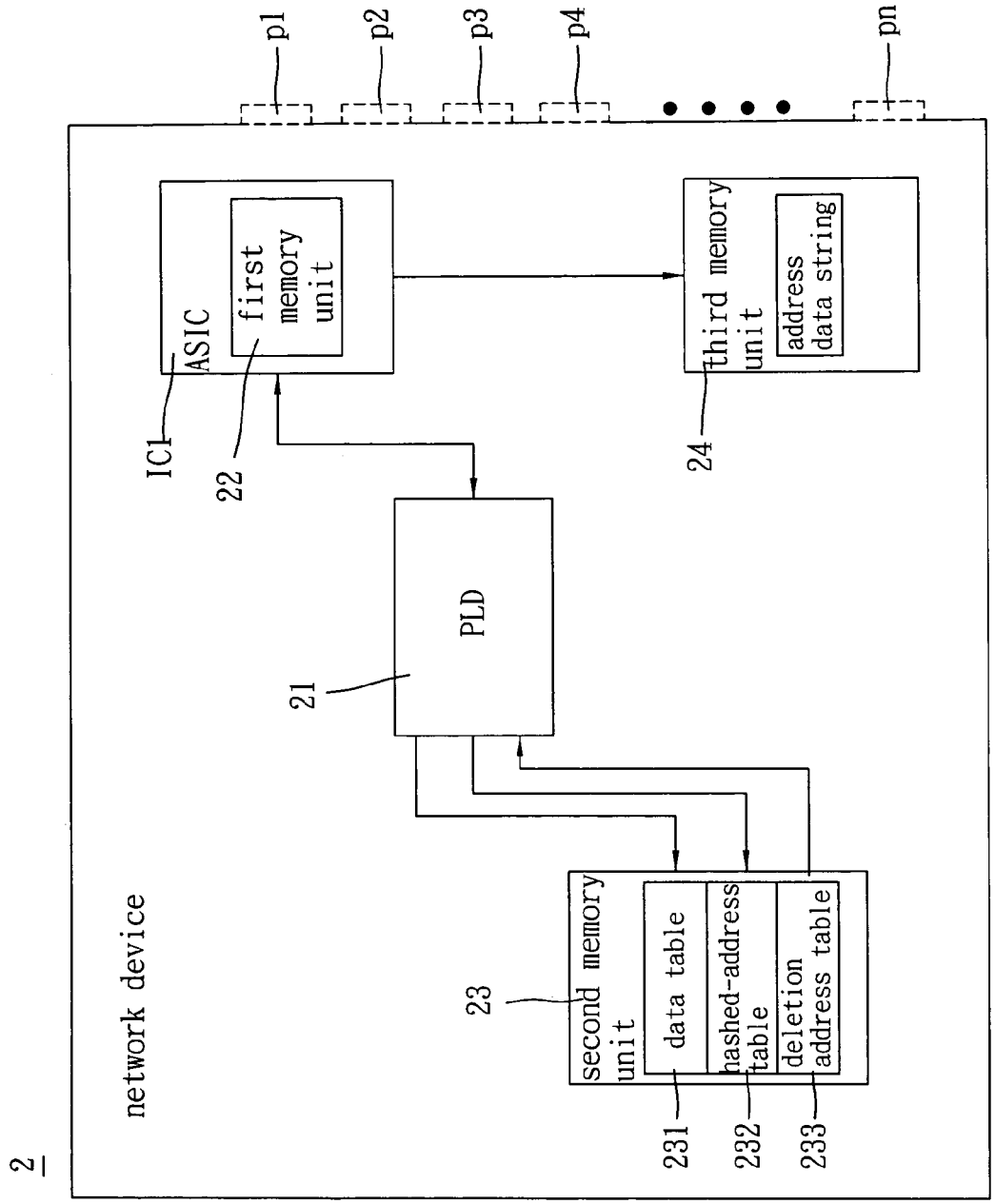
FIG. 2 is a block diagram showing a network device according to a preferred embodiment of the invention.

Referring to FIG. 2, a network device 2 according to the preferred embodiment of the invention has a programmable logic device (PLD) 21, a first memory unit 22, a second memory unit 23 and a third memory unit 24. In addition, the network device 2 in this embodiment further has a plurality of connection ports p1-pn, each of which may be connected to a terminal device (not shown). Thus, all terminal devices may transfer data packets through the network device 2.

In this embodiment, the programmable logic device 21 is electrically connected to the first memory unit 22 and the second memory unit 23. Herein, the programmable logic device 21 is a FPGA (Field Programmable Gate Array), which has a plurality of logic gates and can transfer electronic signals to perform logic judgments and operations. In this embodiment, the first memory unit 22 is located in an ASIC (Application-Specific Integrated Circuit) IC1, and the first memory unit 22 is a cache memory. In addition, the ASIC IC1 can further include a control circuit, a signal processing circuit, or other circuit. The second memory unit 23 stores a data table 231, a hashed-address table 232 and a deletion address table 233. In this embodiment, the second memory unit 23 is a DRAM (Dynamic Random Access Memory). In addition, the third memory unit 24 is electrically connected to the ASIC IC1.

Figure 3:
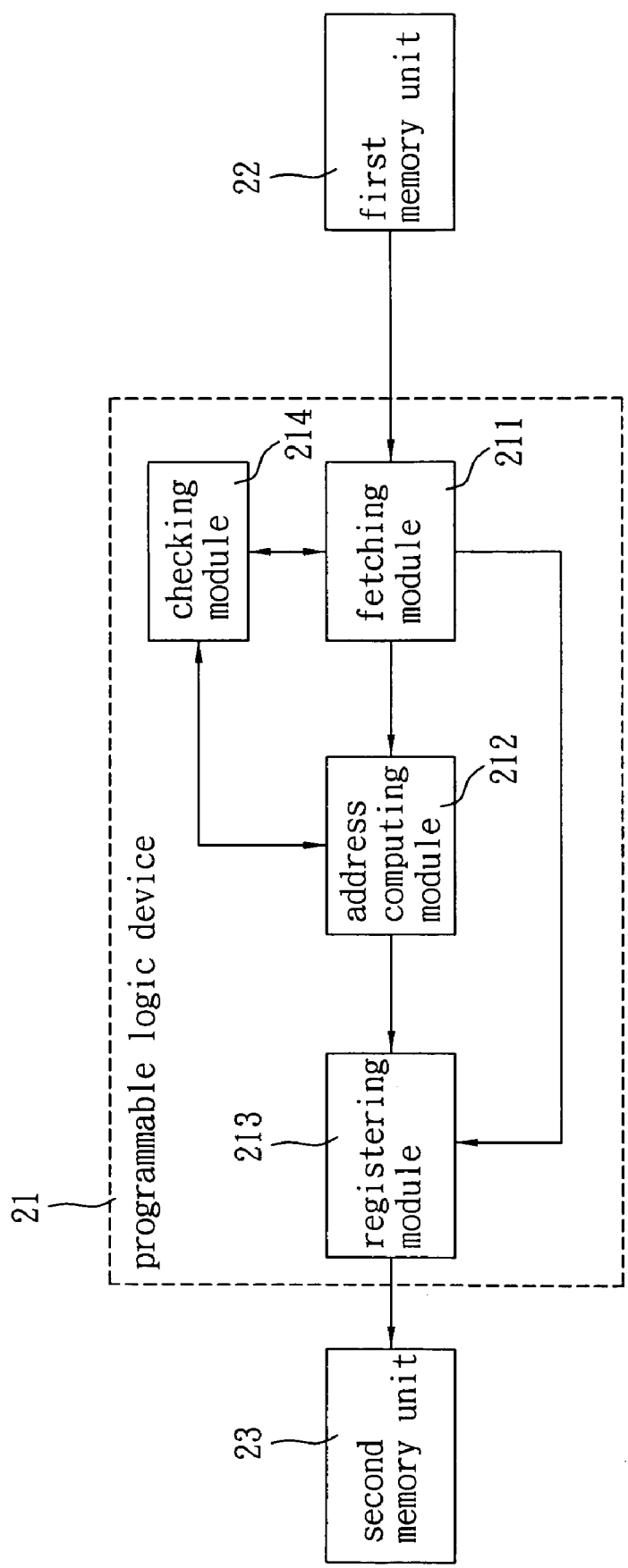
FIG. 3 is a block diagram showing a programmable logic device of the network device according to the preferred embodiment of the invention.

In addition, referring to FIG. 3, the programmable logic device 21 of this embodiment has a fetching module 211, an address computing module 212, a registering module 213, and a checking module 214. The fetching module 211 is electrically connected to the first memory unit 22, the address computing module 212, and the checking module 214. The registering module 213 is electrically connected to the fetching module 211, the address computing module 212 and the second memory unit 23. The checking module 214 is electrically connected to the address computing module 212. In this embodiment, each of the fetching module 211, the address computing module 212, the registering module 213, and the checking module 214 has a plurality of logic gates.

Figure 4:
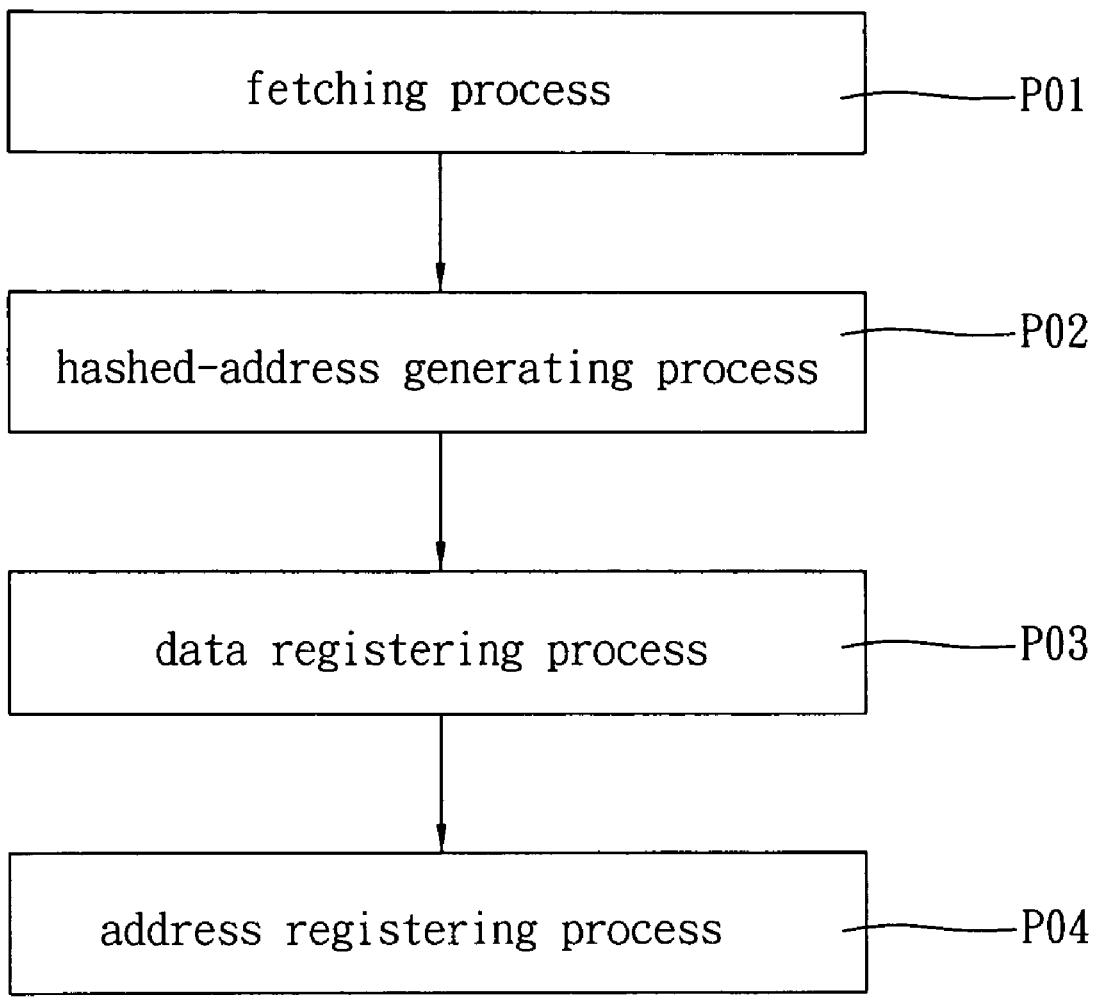
FIG. 4 is a flow chart showing an address learning method according to the preferred embodiment of the invention.

The network device 2 and the address learning method thereof according to this embodiment will be further described with reference to FIGS. 2 to 4. The address learning method of this embodiment includes a fetching process P01, a hashed-address generating process P02, a data registering process P03 and an address registering process P04.

In the fetching process P01, the fetching module 211 of the programmable logic device 21 fetches an address data string from the first memory unit 22. The data contained in the address data string is mainly a MAC address of the terminal device, a connection port identifier or a virtual LAN (VLAN) identifier. According to the Ethernet protocol, the data packet outputted from a terminal device on the network includes a target address and a source address. The target address is the MAC address corresponding to the terminal device for receiving the data packet, while the source address is the MAC address corresponding to the terminal device for outputting the data packet. If one terminal device connected to the network device 2 transfers a data packet to the network device 2 through the connection port p1, the first memory unit 221 stores the MAC address of the terminal device, the identifier of the connection port p1 and the virtual LAN identifier assigned according to the connection port p1. It is to be noted that the fetching module 211 of this embodiment is composed of a plurality of logic gates.

In this embodiment, the address learning method may further include a checking process for checking whether the address data string is effective data by the checking module 214 of the programmable logic device 21.

In the hashed-address generating process P02, an address computing module 212 of the programmable logic device 21 generates a hashed-address according to the address data string fetched by the fetching module 211. The hashed-address is a 20-bit binary code for indicating the address of the third memory unit 24 for storing the address data string. In this embodiment, the address computing module 212 is composed of a plurality of logic gates, which can transfer the electronic signal and complete the address operation.

In this embodiment, the address learning method may further include another checking process for checking whether the hashed-address generated by the address computing module 212 is repeated by the checking module 214. That is, the checking module 214 confirms whether data is stored in the hashed-address of the network device 2 so as to prevent the address data string from being stored in the same address of the third memory unit 24 to overwrite the previously stored data.

In the data registering process P03, a registering module 213 of the programmable logic device 21 writes the address data string into the data table 231 of the second memory unit 23.

In the address registering process P04, the registering module 213 of the programmable logic device 21 writes the hashed-address into the hashed-address table 232 of the second memory unit 23.

In this embodiment, the network device 2 further has a calculator program for reading out the address data string and the hashed-address from the data table 231 and the hashed-address table 232, respectively, and writing the address data string into an address of the third memory unit 24 corresponding to the hashed-address. Heretofore, the network device 2 finishes an address learning process. In this embodiment, the calculator program only executes the operation of writing the address data string into the third memory unit 24, and other operations such as fetching, checking, address computing and registering are performed by the programmable logic device 21 having the logic gates. Of course, the processing speed of the logic gate for processing data is far higher than the executing speed of the program. Consequently, the address learning rate and the efficiency of the network device 2 can be greatly enhanced.

In addition, the calculator program can write a deletion address into the deletion address table 233 of the second memory unit 23 and output a deletion instruction to the programmable logic device 21, and the programmable logic device 21 can fetch the deletion address from the deletion address table 233. In this case, the programmable logic device 21 may command an application specific integrated circuit (ASIC) IC1 to delete the data stored in the address of the third memory unit 24 corresponding to the deletion address according to the deletion address. In particular, the ASIC IC1 may have a control circuit to perform the deletion action. In this embodiment, the deletion address is a 20-bit binary code, which points out the address of the third memory unit 24, in which the address data string is to be deleted. When the topology change occurs or the manual setting is deleted, the calculator program and the programmable logic device 21 can match with each other to increase the data updating speed of the third memory unit 24 and to prevent the network bandwidth from being occupied when the network device 2 transfers the data packet by way of broadcasting.

In summary, the network device of the invention and the address learning method thereof utilize the programmable logic device composed of logic gates to perform the address learning function. The programmable logic device performs the main operations of the address learning function, such as data fetching, data checking and hashed-address generating, which take a longer period of time and a higher efficiency, and the calculator program is only in charge with the operation of writing the address into the memory unit. Compared to the prior art using software control, the invention can greatly increase the address learning speed of the network device. Consequently, because the address learning speed is increased in the large LAN (e.g. the Metro Ethernet), the opportunity for the network device to transfer the data packet by way of broadcasting can be decreased such that the usage of the network bandwidth can be increased, and the transmission speed and efficiency of the LAN can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An address learning method for a network device having a plurality of connection ports, at least one of which is electrically connected to a terminal device, the method comprising:

a fetching process for fetching an address data string from a first memory unit by a programmable logic device;

a hashed-address generating process for generating a hashed-address by the programmable logic device;

a data registering process for writing the address data string into a data table; and an address registering process for writing the hashed-address into a hashed-address table, wherein the method is applied to a calculator program executed by a computing unit, wherein the computing unit reads the address data string and the hashed-address respectively from the data table and the hashed-address table and writes the address data string into an address of a third memory unit corresponding to the hashed-address, wherein the computing unit writes a deletion address into a deletion address table and outputs a deletion instruction to the programmable logic device, and wherein the programmable logic device fetches the deletion address from the deletion address table and deletes data in an address of the third memory unit corresponding to the deletion address.

2. The method according to claim 1, further comprising a checking process for checking whether the address data string is effective data.

3. The method according to claim 1, further comprising a checking process for checking whether the hashed-address is repeated.

4. The method according to claim 1, wherein the address data string comprises a MAC (Media Access Control) address, a connection port identifier or a virtual LAN identifier of the terminal device.

5. The method according to claim 1, wherein the data table and the hashed-address table are located in a second memory unit.

6. The method according to claim 1, wherein the data registering process writes the address data string into the data table by the programmable logic device.

7. The method according to claim 1, wherein the address registering process writes the hashed-address into the hashed-address table by the programmable logic device.

8. The method according to claim 1, wherein the programmable logic device commands an application specific integrated circuit (ASIC) to delete data in an address of the third memory unit corresponding to the deletion address.

9. A network device, comprising:

a first memory unit;

a second memory unit having a data table and a hashed-address table;

a programmable logic device electrically connecting to the first memory unit and the second memory unit, and having a fetching module, an address computing module and a registering module, wherein the fetching module fetches an address data string from the first memory unit, the address computing module generates a hashed-address, and the registering module writes the address data string and the hashed-address into the data table and the hashed-address table, respectively, a third memory unit, wherein the address data string is recorded in the third memory unit; and a calculator program executed by a computing unit for respectively reading the address data string and the hashed-address from the data table and the hashed-address table, and writing the address data string into an address of the third memory unit corresponding to the hashed-address wherein the second memory unit further has a deletion address table, and the computing unit writes a deletion address into the deletion address table and outputs a deletion instruction to the programmable logic device, and wherein the programmable logic device deletes data in an address of the third memory unit corresponding to the deletion address according to the deletion address of the deletion address table.

10. The device according to claim 9, wherein the programmable logic device is a field programmable gate array (FPGA).

11. The device according to claim 9, wherein the programmable logic device comprises a plurality of logic gates.

12. The device according to claim 9, wherein the fetching module, the address computing module or the registering module comprises a plurality of logic gates.

13. The device according to claim 9, wherein the first memory unit is a cache.

14. The device according to claim 9, wherein the second memory unit is a dynamic random access memory (DRAM).

15. The device according to claim 9, wherein the programmable logic device further comprises a checking module electrically connecting to the fetching module for checking whether the address data string is effective data.

16. The device according to claim 9, wherein the programmable logic device further comprises a checking module electrically connecting to the address computing module for checking whether the hashed-address is repeated.

17. The device according to claim 9, further comprising a plurality of connection ports, wherein at least one of the connection ports electrically connects to a terminal device.

18. The device according to claim 17, wherein the address data string comprises a MAC (Media Access Control) address, a connection port identifier or a virtual LAN identifier of the terminal device.

19. The device according to claim 9, further comprising an application specific integrated circuit (ASIC) electrically connected with the programmable logic device and the third memory unit, wherein the application specific integrated circuit (ASIC) deletes data in an address of the third memory unit corresponding to the deletion address.

20. The device according to claim 9, wherein the first memory unit is disposed in an application specific integrated circuit (ASIC).

* * * * *